(12) United States Patent
Rodman et al.

(10) Patent No.: US 8,375,705 B2
(45) Date of Patent: Feb. 19, 2013

(54) EXHAUST SYSTEM IMPLEMENTING LOW-TEMPERATURE REGENERATION STRATEGY

(75) Inventors: Anthony Clark Rodman, Chillicothe, IL (US); Cornelius Nicolae Opris, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 796 days.

(21) Appl. No.: 12/155,193

(22) Filed: May 30, 2008

(65) Prior Publication Data
US 2009/0293455 A1 Dec. 3, 2009

(51) Int. Cl.
*F01N 3/00* (2006.01)
(52) U.S. Cl. ............................................ 60/295; 60/311
(58) Field of Classification Search .................. 60/286, 60/295, 297, 300, 303, 311
See application file for complete search history.

(56) References Cited

U.S. PATENT DOCUMENTS

| | | | |
|---|---|---|---|
| 4,617,793 A | 10/1986 | Suzuki et al. | |
| 6,966,179 B2 | 11/2005 | Onodera et al. | |
| 7,032,376 B1 | 4/2006 | Webb et al. | |
| 7,146,804 B2 | 12/2006 | Yahata et al. | |
| 7,159,391 B2 | 1/2007 | Kogo et al. | |
| 7,219,493 B2 * | 5/2007 | Tsutsumoto et al. | 60/297 |
| 7,325,395 B2 * | 2/2008 | Kuboshima et al. | 60/295 |
| 7,513,108 B2 | 4/2009 | Tomlins et al. | |
| 2003/0106308 A1 * | 6/2003 | Gabe et al. | 60/295 |
| 2003/0106309 A1 * | 6/2003 | Morimoto et al. | 60/295 |
| 2003/0131592 A1 * | 7/2003 | Saito et al. | 60/295 |
| 2003/0145581 A1 | 8/2003 | Tashiro et al. | |
| 2003/0230078 A1 * | 12/2003 | Yahata et al. | 60/295 |
| 2004/0144086 A1 * | 7/2004 | Otake et al. | 60/295 |
| 2004/0216451 A1 * | 11/2004 | LaBarge et al. | 60/286 |
| 2004/0223892 A1 * | 11/2004 | Kojima | 422/177 |
| 2005/0000209 A1 * | 1/2005 | Takahashi et al. | 60/286 |
| 2005/0044845 A1 * | 3/2005 | Onodera et al. | 60/286 |
| 2005/0109019 A1 | 5/2005 | Blaschke et al. | |
| 2005/0126161 A1 | 6/2005 | Otake et al. | |

(Continued)

FOREIGN PATENT DOCUMENTS

| | | |
|---|---|---|
| CN | 1590726 | 3/2005 |
| EP | 1921288 | 5/2008 |

(Continued)

*Primary Examiner* — Thomas Denion
*Assistant Examiner* — Patrick Maines
(74) *Attorney, Agent, or Firm* — Finnegan, Henderson, Farabow, Garrett & Dunner LLP

(57) ABSTRACT

An exhaust control system for use with a combustion engine is disclosed. The exhaust control system may have an exhaust passage configured to receive a flow of exhaust from the combustion engine, a particulate filter located within the exhaust passage, and an oxidation catalyst located upstream of the filter. The oxidation catalyst may be configured to promote regeneration of the particulate filter and may have an activation temperature range. The exhaust control system may also have a heating device located to selectively warm the oxidation catalyst to within the activation temperature range, and a controller in communication with the combustion engine and the heating device. The controller may be configured to detect a loading of the particulate filter exceeding a first loaded threshold amount, and to detect a low temperature condition of the combustion engine. The controller may further be configured to activate the heating device to warm the oxidation catalyst when the loading of the particulate filter exceeds the first loaded threshold amount during the low temperature condition and until the loading of the particulate filter is reduced below a second loaded threshold amount.

16 Claims, 2 Drawing Sheets

U.S. PATENT DOCUMENTS

| | | |
|---|---|---|
| 2005/0166580 A1 | 8/2005 | Pfaeffle et al. |
| 2005/0284138 A1 | 12/2005 | Imai et al. |
| 2006/0000203 A1* | 1/2006 | Stanglmaier et al. ........... 60/286 |
| 2006/0130468 A1 | 6/2006 | Sun et al. |
| 2007/0056274 A1 | 3/2007 | Wills |
| 2007/0234712 A1 | 10/2007 | Ohmura |
| 2008/0006025 A1 | 1/2008 | McCarthy |
| 2008/0010971 A1 | 1/2008 | Gioannini et al. |
| 2008/0028753 A1 | 2/2008 | Wagner et al. |
| 2008/0041035 A1 | 2/2008 | Sawada et al. |
| 2009/0183495 A1* | 7/2009 | Onodera et al. ................ 60/286 |

FOREIGN PATENT DOCUMENTS

| | | |
|---|---|---|
| JP | 2002/180816 | 6/2002 |
| WO | 2007079832 | 7/2007 |

* cited by examiner

EXHAUST SYSTEM IMPLEMENTING LOW-TEMPERATURE REGENERATION STRATEGY

TECHNICAL FIELD

The present disclosure relates generally to an exhaust system and, more particularly, to an exhaust system that implements a low-temperature regeneration strategy.

BACKGROUND

Particulate filters are utilized to remove particulate matter from an engine's exhaust flow. After an extended period of use, however, the particulate filter can become overloaded with particulate matter, creating a risk for filter damage and reducing engine performance. The collected particulate matter can be removed from the particulate filter through a process called regeneration.

Two different regeneration strategies are known, including active regeneration and passive regeneration. Active regeneration is the burning away of trapped particulate matter at high temperatures, typically in excess of 600° C. These temperatures can be periodically achieved through engine control, electric grids, and fuel fired burners located upstream of the filter to heat the exhaust flowing through the filter. Passive regeneration involves the use of a catalyst to reduce an oxidizing temperature of the trapped particulate matter such that it can be continually burned away at a low temperature without the use of engine control, electric grids, and fuel fired burners.

When a machine is stationary, active regeneration is undesirable, as it can heat the exhaust system too high for the immediate environment. For example, if a machine was to stop and remain located over dry debris, it might be possible for the high regeneration temperature of the exhaust system to ignite the debris. Thus, when a machine is parked and idling for long periods of time, such as occurs during an overnight stay, active regeneration is generally disabled and/or prohibited.

Unfortunately, when the machine idles, the exhaust temperatures of the machine can be so low that the oxidation catalyst of a passive regeneration system performs poorly. That is, the catalyst only functions properly when the exhaust temperature is within a predetermined activation range (250-400° C.), and this range can be difficult and expensive to attain during extended idling. Thus, without operator intervention, passive regeneration may only be marginally successful at removing the trapped particulate matter during extended idling and, in some situations, may not work at all. When regeneration does not function properly, the particulate filter can become completely clogged, resulting in malfunction of the engine that requires immediate servicing.

One attempt at addressing the problems described above is disclosed by U.S. Patent Publication No. 2005/0284138 (the '138 publication) by Imai et al., published on Dec. 29, 2005. The '138 publication discloses a regeneration control method for use with a continuously regenerating trap (CRT). The CRT includes a diesel particulate filter (DPF), and an oxidation catalyst located upstream of the DPF. The oxidation catalyst converts NO from an engine's exhaust to $NO_2$, which is then used to oxidize particulate matter trapped within the DPF. The $NO_2$ oxidizes the particulate matter at a lower temperature than would otherwise be possible. As long as an activating temperature of the catalyst is maintained, regeneration of the DPF is occurring, and occurring at a rate corresponding to the exhaust temperature.

The regeneration control method of the '138 publication includes monitoring soot loading of the DPF, and classifying the soot loading into three or four different categories of increasing amounts. The method further includes monitoring a temperature of the exhaust. Based on the soot loading classification and the exhaust temperature, different regeneration strategies are employed. In one strategy, when the soot loading of the DPF is classified as high and the exhaust temperatures are low such as during extended idling, the exhaust temperature can be artificially elevated such that the catalyst is activated and passive regeneration is promoted. The exhaust temperatures are elevated through the use of multiple post fuel injections of the associated engine.

The system of the '138 publication may lack efficiency. Specifically, artificially elevating the exhaust temperatures during idling requires large quantities of fuel and, at an idling condition, the temperature must be maintained at the elevated state for long periods of time to remove all of the soot present within the DPF. Without further control over the regeneration process, time and fuel efficiency of the process may be low.

The disclosed exhaust system is directed toward overcoming one or more of the problems set forth above and/or other problems in the art.

SUMMARY OF THE INVENTION

One aspect of the present disclosure is directed to an exhaust control system for use with a combustion engine. The exhaust control system may include an exhaust passage configured to receive a flow of exhaust from the combustion engine, a particulate filter located within the exhaust passage, and an oxidation catalyst located upstream of the filter. The oxidation catalyst may be configured to promote regeneration of the particulate filter and may have an activation temperature range. The exhaust control system may also include a heating device located to selectively warm the oxidation catalyst to within the activation temperature range, and a controller in communication with the combustion engine and the heating device. The controller may be configured to detect a loading of the particulate filter exceeding a first loaded threshold amount, and to detect a low temperature condition of the combustion engine. The controller may further be configured to activate the heating device to warm the oxidation catalyst when the loading of the particulate filter exceeds the first loaded threshold amount during the low temperature condition and until the loading of the particulate filter is reduced below a second loaded threshold amount.

Another aspect of the present disclosure is directed to a method of treating exhaust from a combustion engine. The method may include collecting particulate matter from the exhaust, and converting a first constituent of the exhaust to a second constituent that promotes combustion of the collected particulate matter. The method may also include detecting an amount of collected particulate matter exceeding a normal temperature threshold amount, and detecting a low temperature condition of the combustion engine. The method may further include selectively heating the exhaust to facilitate the converting when the amount of collected particulate matter exceeds the normal temperature threshold amount during the low temperature condition and until the amount of collected particulate matter is reduced below a low temperature threshold amount.

DETAILED DESCRIPTION

Figure 1:
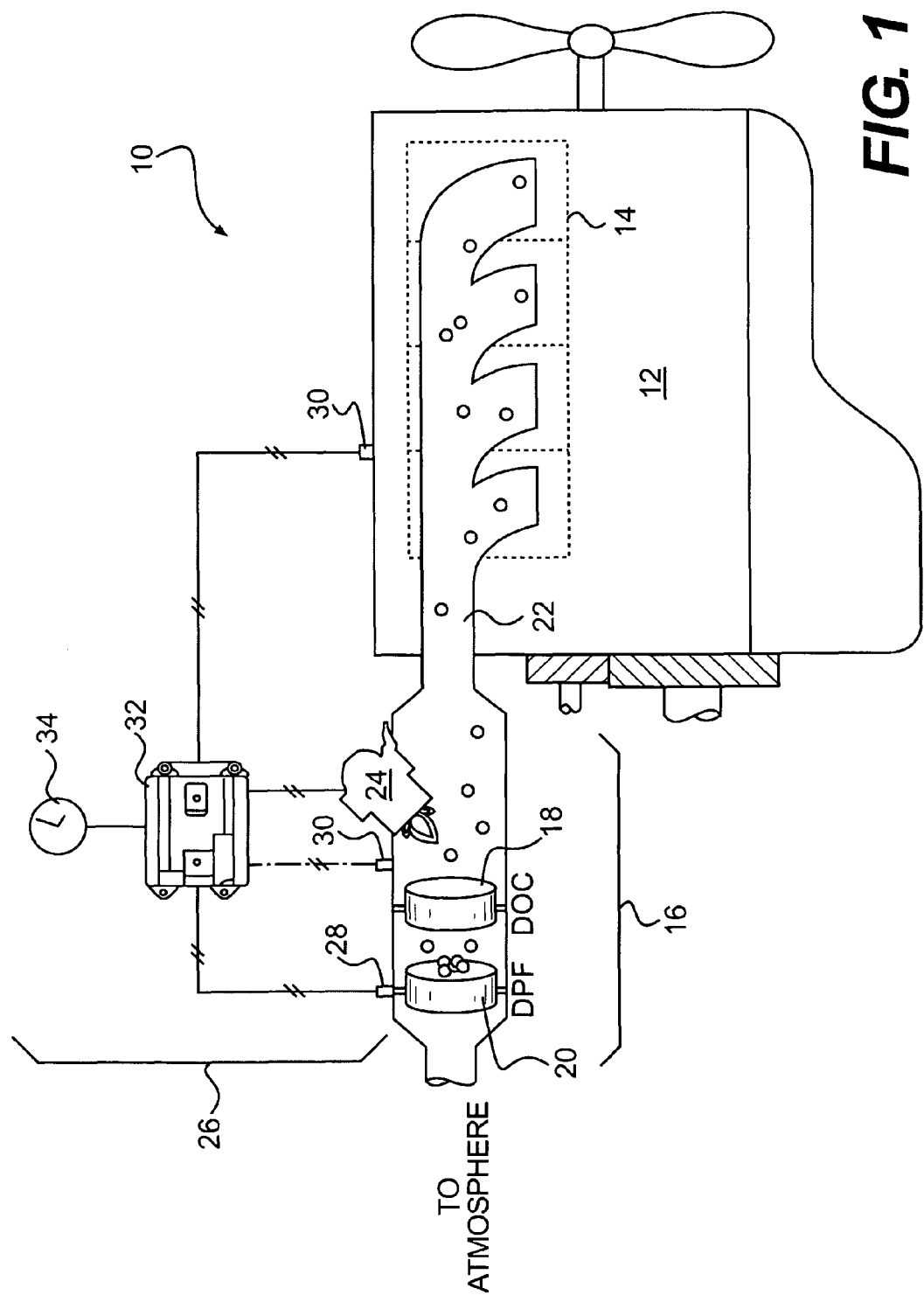
FIG. 1 is a diagrammatic illustration of an exemplary disclosed power system.

FIG. 1 illustrates an exemplary power system 10. For the purposes of this disclosure, power system 10 is depicted and described as a diesel-fueled, internal combustion engine. However, it is contemplated that power system 10 may embody any other type of combustion engine such as, for example, a gasoline or a gaseous fuel-powered engine. Power system 10 may include an engine block 12 that at least partially defines a plurality of cylinders 14. It is contemplated that power system 10 may include any number of cylinders 14 and that cylinders 14 may be disposed in an "in-line" configuration, a "V" configuration, or any other conventional configuration.

An exhaust system 16 may be associated with power system 10, and include components that condition and direct exhaust from cylinders 14 to the atmosphere. For example, exhaust system 16 may include a first treatment device 18 and a second treatment device 20 disposed in series within a common exhaust passage 22. A heating device 24 may be located upstream of first treatment device 18 to warm first treatment device 18. It is contemplated that exhaust system 16 may include different or additional components than described above such as, for example, energy extraction devices, bypass components, braking devices, attenuation devices, additional treatment devices, and other known components.

First treatment device 18 may cooperate with second treatment device 20 to condition the exhaust flow from power system 10. In particular, first treatment device 18 may embody a catalyst configured to convert a first constituent of the exhaust flow to a second constituent, which may promote a regeneration process within second treatment device 20 at low temperatures. In one example, first treatment device 18 may be a diesel oxidation catalyst (DOC). As a DOC, first treatment device 18 may include a porous ceramic honeycomb structure or metal mesh substrate coated or otherwise impregnated with a material that catalyzes a chemical reaction to alter the composition of the exhaust. For example, first treatment device 18 may include a precious metal washcoat of platinum or vanadium that facilitates the conversion of NO to $NO_2$.

The conversion efficiency and/or rate of first treatment device 18 may be related to a temperature of exhaust entering first treatment device 18. That is, first treatment device 18 may have an activation temperature range, for example between about 200-400° C. Within this activation temperature range, first treatment device 18 may convert an amount of NO to $NO_2$ suitable to promote passive regeneration of second treatment device 20. As the temperature of first treatment device 18 increases toward its upper limit, the conversion rate of NO to $NO_2$ may proportionally increase. When outside of the activation temperature range, the rate of conversion may reduce dramatically.

Second treatment device 20 may receive exhaust from first treatment device 18 to remove and collect constituents of the exhaust. In particular, second treatment device 20 may embody a particulate filter. As such, first and second treatment devices 18, 20 together may form a continuously regenerating trap (CRT). It is contemplated that, instead of separate devices, the functions of catalyzing and trapping may be performed by a single integral device, if desired. As a particulate filter, second treatment device 20 may be designed to trap particulate matter and include a wire mesh or ceramic honeycomb medium. The use of the particulate trap for extended periods of time during cold conditions (i.e., conditions during which the temperature of the exhaust entering first treatment device 18 is near or below its lower activation temperature limit) may slow regeneration and cause the particulate matter to build up within the medium. If unaccounted for, this buildup of matter could reduce the functionality of the filter and subsequent engine performance.

Heating device 24 may be situated to selectively promote regeneration of second treatment device 20. Heating device 24 may embody, for example, a fuel-fired burner, an electric grid, or other similar device known in the art configured to selectively heat the exhaust flowing through first treatment device 18. As the heated exhaust flows through first treatment device 18, a suitable activation temperature thereof may be attained and a desired amount of NO may be converted to $NO_2$. As the $NO_2$ flows through second treatment device 20, a part or all of the particulate matter trapped therein may undergo an exothermic reaction and be reduced to ash. This process may be know as "passive+" regeneration, as the temperature of the exhaust may be artificially raised to activate the catalyst (as opposed to just passive regeneration where the temperatures may not be artificially raised or opposed to active regeneration where the temperatures are raised to very high levels that burn off particulate matter without the use of a catalyst).

A control system 26 may be associated with power system 10 and include components that cooperate to regulate the $NO_2$ concentration and/or the temperature of exhaust within first and second treatment devices 18, 20 in order to facilitate passive regeneration. Specifically, control system 26 may include a first sensor 28 configured to determine a soot loading of second treatment device 20, a second sensor 30 configured to determine an operational condition of power system 10, and a controller 32 in communication with first and second sensors 28, 30 and with heating deice 24. Controller 32 may be configured to control operation of heating device 24 in response to input received from first and second sensors 28, 30.

First sensor 28 may embody any type of sensor utilized to determine an amount of particulate buildup within second treatment device 20. For example, first sensor 28 may embody a pressure sensor or pair of pressure sensors, a temperature sensor, a model driven virtual sensor, an RF sensor, or any other type of sensor known in the art. First sensor 28 may generate a signal directed to controller 32 indicative of the particulate buildup.

Second sensor 30 may embody any type of sensor configured to monitor an operational condition of power system 10. In one example, second sensor 30 may be a speed sensor associated with an output of power system 10. As such, second sensor 30 may generate a signal indicative of the speed of power system 10, and direct this signal to controller 32. When the speed signal indicates a speed lower than a threshold speed, for example an idle speed, power system 10 may be considered to be operating in a cold condition. In another example, second sensor 30 may be a temperature sensor configured to generate a signal indicative of a temperature of the exhaust exiting power system 10. In this example, when the temperature signal indicates an exhaust temperature being below a threshold temperature, for example below a suitable activation temperature of first treatment device 18, power system 10 may be considered to be operating in the cold condition.

Controller 32 may embody a single microprocessor or multiple microprocessors that include a means for controlling an operation of heating device 24 in response to signals received from first and second sensors 28, 30. Numerous commercially available microprocessors can be configured to perform the functions of controller 32. It should be appreciated that controller 32 could readily embody a general power system microprocessor capable of controlling numerous power system functions and modes of operation. Various other known circuits may be associated with controller 32, including power supply circuitry, signal-conditioning circuitry, solenoid driver circuitry, communication circuitry, and other appropriate circuitry.

In one embodiment, a timer 34 may be associated with controller 32. In response to a command from controller 32, timer 34 may track an elapsed time. Signals indicative of this elapsed time may be directed from timer 34 to controller 32.

Figure 2:
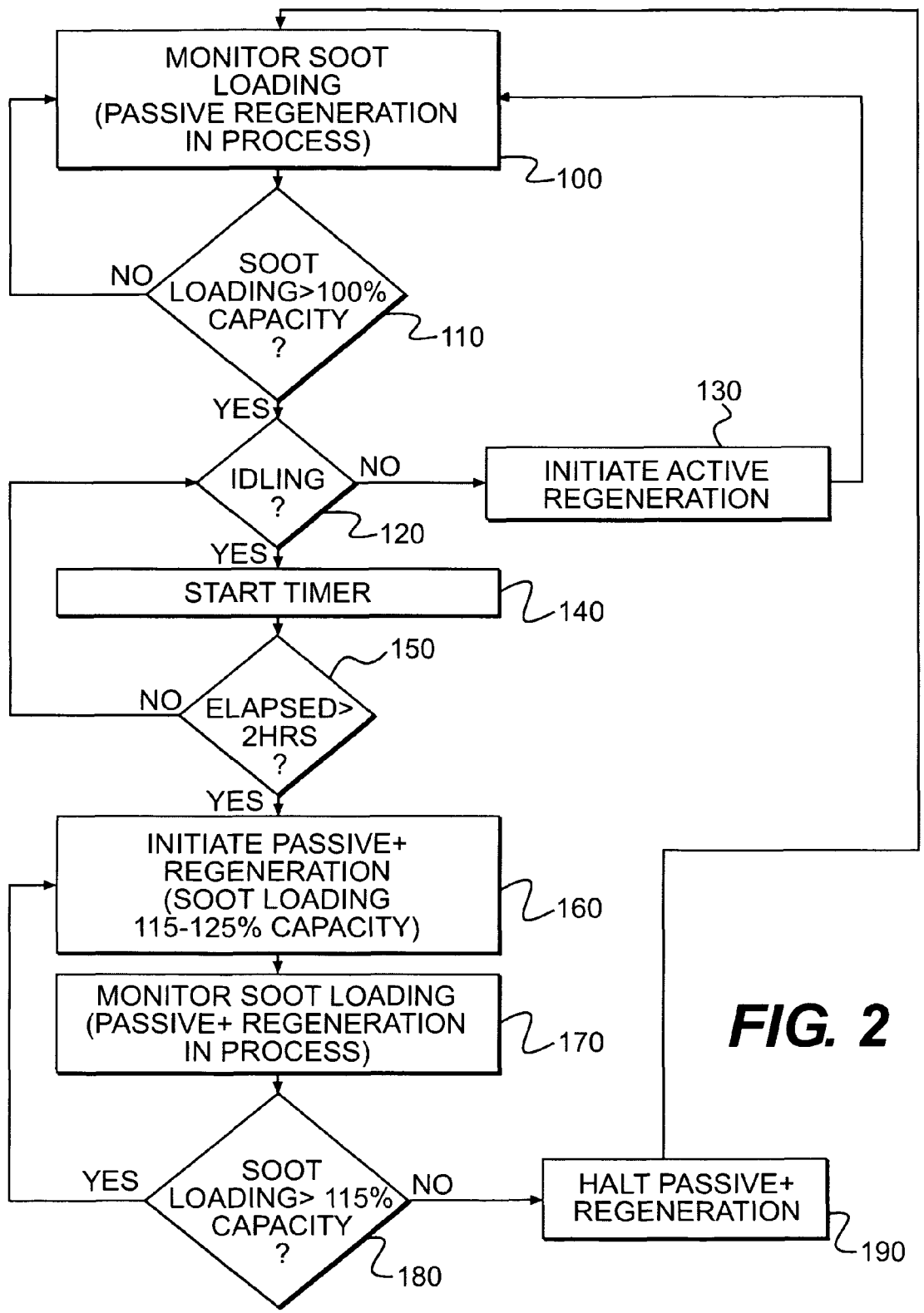
FIG. 2 is a flowchart of an exemplary disclosed method performed by the power system of FIG. 1.

FIG. 2 illustrates an exemplary method performed by controller 32. FIG. 2 will be discussed in more detail in the following section to further illustrate the disclosed concepts.

Industrial Applicability

The disclosed exhaust system may be applicable to any engine where pollution control during cold conditions is important. The disclosed system may provide for particulate reduction during extended cold conditions such as during idling, by executing a low temperature regeneration strategy. This low temperature regeneration strategy will now be described.

As shown in FIG. 2, the strategy may begin at startup of power system 10 with the monitoring of soot loading within second treatment device 20 by second sensor 30 (Step 100). As described above, during normal temperature operating conditions (i.e., when the temperature of the exhaust exiting power system 10 is within the activation temperature range of first treatment device 18 or otherwise operating at a non-idle condition), passive regeneration may be occurring substantially continuously. While monitoring the soot loading of second treatment device 20, controller 32 may compare the soot loading to a first loaded threshold value (Step 110). In one example, the first loaded threshold value may be a normal temperature threshold amount about equal to 100% capacity of second treatment device 20 during a normal temperature condition. When soot loading exceeds this 100% capacity, regeneration of second treatment device 20 during the normal temperature conditions described above could result in excessive temperatures that damage second treatment device 20. If the soot loading of second treatment device 20 is below the first loaded threshold value, control may return to step 100.

However, when the signal from second sensor 30 indicates the soot loading of second treatment device 20 is approaching or has surpassed the first loaded threshold value, controller 32 may then determine if power system 10 is operating in a cold condition (i.e., if power system 10 is idling or the exhaust temperatures thereof are below the activation temperature range of second treatment device 20) (Step 120). If power system 10 is not operating in a cold condition (i.e., if power system is operating in a normal condition) and the soot loading of second treatment device 20 has exceeded the first loaded threshold value, controller 32 may initiate active regeneration. That is, controller 32 may control heating device 24 to elevate the temperature of the exhaust passing through second treatment device 20 to a combustion threshold of the particulate matter such that substantially all of the particulate matter trapped therein is burned away. Because active regeneration may be implemented during a normal temperature condition, little energy may be required of heating device 24 to sufficiently elevate the temperatures.

If power system 10 is operating in a cold condition and the soot loading of second treatment device 20 has exceeded the first loaded threshold value, controller 32 may command timer 34 to begin tracking time (Step 140). Controller 32 may monitor the elapsed time signals from timer 34, and compare the elapsed time to a threshold duration (Step 150), and cycle through steps 120-150 until the elapsed period of time exceeds the threshold duration. In one example, the threshold duration may be about two hours. If during this two hour period, the operation of power system 10 returns to or reaches normal temperature conditions, control may follow to step 130 where active regeneration is initiated.

However, by the end of the two hour period, if operation of power system 10 has not yet returned to or reached normal temperature operation, the soot may have accumulated to between about 115-125% of the normal capacity of second treatment device 20. After the two hours has elapsed, controller 32 may conclude that the cold condition is an extended condition, and responsively initiate a passive+ regeneration strategy to reduce the amount of particulate matter trapped within second treatment device 20 (Step 160). To initiate passive+ regeneration, controller 32 may command heating device 24 to elevate the temperatures to within the activation range of first treatment device 18, and preferably toward the upper limit thereof. As the exhaust temperature rises to within the activation range, first treatment device 18 may convert an amount of NO to $NO_2$ sufficient to promote combustion of the trapped particulate matter.

Controller 32 may monitor the passive+ regeneration of second treatment device 20 (Step 170). During this regeneration process, as the particulate matter contained within second treatment device 20 is burning, controller 32 may slow or even halt the process when the remaining amount of particulate matter is reduced below a second loaded threshold value. In one example, the second loaded threshold value may be a low temperature threshold amount about equal to 115% of the normal temperature capacity of second treatment device 20. Controller 32 may compare the remaining amount of particulate matter to the second loaded threshold value (Step 180), and slow or halt the process by commanding heating device 24 to stop heating exhaust (Step 190) after the remaining amount falls below the second loaded threshold value.

By heating first treatment device 18 during cold conditions, regeneration of second treatment device 20 may be performed throughout an entire operating cycle of power system 10. And, the reduction of the particulate matter buildup to below 115% may allow for extended operation of power system 10 in cold conditions. Further, by only partially reducing the amount of particulate matter buildup within second treatment device 20 during the cold conditions, as opposed to burning it away completely, the efficiency of power system 10 may be high. That is, the use of heating device 24 during a cold condition to completely regeneration second treatment device 20 can require a large amount of fuel. Thus, by using heating device 24 sparingly during cold conditions and, instead, waiting for more efficient (i.e., higher) temperature conditions to perform complete regeneration, little fuel may be consumed.

It will be apparent to those skilled in the art that various modifications and variations can be made to the disclosed exhaust system without departing from the scope of the disclosure. Other embodiments of the exhaust system will be apparent to those skilled in the art from consideration of the specification and practice of the exhaust system disclosed herein. It is intended that the specification and examples be considered as exemplary only, with a true scope of the disclosure being indicated by the following claims and their equivalents.

What is claimed is:

1. An exhaust control system for use with a combustion engine, comprising:
   an exhaust passage configured to receive a flow of exhaust from the combustion engine;
   a particulate filter located within the exhaust passage;
   an oxidation catalyst located to promote regeneration of the particulate filter, the oxidation catalyst having an activation temperature range;
   a heating device located to selectively heat the oxidation catalyst to within the activation temperature range; and
   a controller in communication with the combustion engine and the heating device, the controller being configured to:
   detect a loading of the particulate filter exceeding a first loaded threshold amount;
   detect a low temperature condition of the combustion engine; and
   activate the heating device to heat the oxidation catalyst after the loading of the particulate filter exceeds the first loaded threshold amount, the control of the heating device stopping when the loading of the particulate filter is reduced below a second loaded threshold amount;
   wherein the second loaded threshold amount is greater than the first loaded threshold amount.

2. The exhaust control system of claim 1, wherein the low temperature condition is associated with idling of the combustion engine.

3. The exhaust control system of claim 1, wherein the oxidation catalyst converts NO in the flow of exhaust to $NO_2$.

4. The exhaust control system of claim 1, further including a timer in communication with the controller, wherein the controller is configured to activate the heating device only after an amount of time has elapsed since the loading of the particulate filter exceeds the first loaded threshold amount during the low temperature condition.

5. The exhaust control system of claim 4, wherein the amount of time is two hours.

6. The exhaust control system of claim 1, wherein the first loaded threshold amount is a maximum capacity of the particulate trap during normal temperature conditions.

7. The exhaust control system of claim 6, wherein the second loaded threshold amount is 115% of the maximum capacity.

8. The exhaust control system of claim 1, wherein the heating of the oxidation catalyst during the low temperature condition promotes passive regeneration.

9. The exhaust control system of claim 1, wherein the controller is further configured to:
   detect a normal temperature condition of the combustion engine; and
   deactivate the heating device during the normal temperature condition.

10. A method of treating exhaust from a combustion engine, comprising:
    collecting particulate matter from the exhaust;
    converting a first constituent of the exhaust to a second constituent that promotes combustion of the collected particulate matter;
    detecting an amount of collected particulate matter exceeding a first temperature threshold amount corresponding to a first temperature condition of the engine;
    detecting a second temperature condition of the combustion engine; and
    selectively heating the exhaust to facilitate the converting when the amount of collected particulate matter exceeds the first temperature threshold amount during the second temperature condition, the heating of the exhaust stopping when the amount of collected particulate matter is reduced below a second temperature threshold amount;
    wherein the second temperature threshold amount is greater than the first temperature threshold amount.

11. The method of claim 10, wherein the second temperature condition is associated with idling of the combustion engine.

12. The method of claim 10, wherein the first constituent is NO and the second constituent is $NO_2$.

13. The method of claim 10, further including tracking an amount of time elapsed since the amount of collected particulate matter exceeded the first temperature threshold amount during the second temperature condition, wherein the step of selectively heating is only performed when the amount of time exceeds a threshold amount of time.

14. The method of claim 13, wherein the threshold amount of time is two hours.

15. The method of claim 10, further including:
    detecting the first temperature condition of the combustion engine; and
    halting the selective heating the exhaust in response to the detected first temperature condition.

16. A power system, comprising:
    an engine configured to combust fuel and generate a flow of exhaust;
    an exhaust passage configured to receive the flow of exhaust from the engine;
    a particulate filter located within the exhaust passage;
    an oxidation catalyst located upstream of the filter and configured to convert NO to $NO_2$ during passive regeneration of the particulate filter, the oxidation catalyst having an activation temperature range;
    a fuel-fired burner located to selectively heat the oxidation catalyst to within the activation temperature range; and
    a controller in communication with the engine and the fuel-fired burner, the controller being configured to:
    detect a loading of the particulate filter exceeding a normal temperature maximum capacity;
    detect a low temperature condition of the combustion engine;
    initiate a timer when the controller detects both the loading of the particulate filter exceeding the normal temperature maximum capacity and the low temperature condition of the combustion engine; and
    activate the fuel-fired burner to heat the oxidation catalyst when the timer exceeds a time threshold amount, and when the loading of the particulate filter exceeds the normal temperature maximum capacity during the low temperature condition, the activation of the fuel-fired burner stopping when the loading of the particulate filter is reduced below a low temperature threshold amount;
    wherein the low temperature threshold amount is greater than the normal temperature maximum capacity.

* * * * *